United States Patent
Liu

(10) Patent No.: US 12,126,155 B1
(45) Date of Patent: Oct. 22, 2024

(54) WALL-EMBEDDED WIRE AND CABLE BOX

(71) Applicant: Zhiyong Liu, Ganzhou (CN)

(72) Inventor: Zhiyong Liu, Ganzhou (CN)

( * ) Notice: Subject to any disclaimer, the term of this patent is extended or adjusted under 35 U.S.C. 154(b) by 0 days.

(21) Appl. No.: 18/662,575

(22) Filed: May 13, 2024

(30) Foreign Application Priority Data

Apr. 22, 2024 (CN) .......................... 202420832264.2

(51) Int. Cl.
*H02G 3/22* (2006.01)
(52) U.S. Cl.
CPC .................................... *H02G 3/22* (2013.01)
(58) Field of Classification Search
CPC ......................................................... H02G 3/22
See application file for complete search history.

(56) References Cited

U.S. PATENT DOCUMENTS

| | | | |
|---|---|---|---|
| D443,811 S * | 6/2001 | Tisbo | D8/356 |
| 6,497,414 B1 * | 12/2002 | Roosen | H02G 15/113 |
| | | | 277/316 |
| D559,660 S * | 1/2008 | DeCosta | D8/356 |
| 8,969,741 B2 * | 3/2015 | Aldrich | H02G 3/083 |
| | | | 174/653 |
| 2006/0185875 A1 * | 8/2006 | Habel | H02G 3/22 |
| | | | 174/50 |
| 2007/0246613 A1 * | 10/2007 | Kennedy | H02G 3/22 |
| | | | 248/56 |
| 2008/0017401 A1 * | 1/2008 | Uchida | H02G 3/22 |
| | | | 174/153 G |
| 2009/0179420 A1 * | 7/2009 | Gai | F16L 5/14 |
| | | | 285/46 |
| 2009/0302034 A1 * | 12/2009 | Makela | H02G 3/088 |
| | | | 174/152 G |
| 2011/0073350 A1 * | 3/2011 | Okuhara | B60R 16/0222 |
| | | | 174/152 G |
| 2012/0048616 A1 * | 3/2012 | Breen, IV | H02G 3/22 |
| | | | 174/651 |
| 2012/0211262 A1 * | 8/2012 | Agusa | F16J 15/064 |
| | | | 174/152 G |
| 2013/0001893 A1 * | 1/2013 | West | F16L 5/14 |
| | | | 277/637 |
| 2014/0065000 A1 * | 3/2014 | Tolbert, Jr. | F04B 39/0276 |
| | | | 418/55.4 |
| 2014/0116752 A1 * | 5/2014 | Sodaro | B64D 29/00 |
| | | | 174/153 G |
| 2015/0318680 A1 * | 11/2015 | Solak | H02G 15/013 |
| | | | 174/650 |

(Continued)

*Primary Examiner* — William H. Mayo, III
*Assistant Examiner* — Rhadames Alonzo Miller

(57) ABSTRACT

A wall-embedded wire and cable box is configured for installing in an installation hole of a wall. The embedded wire box includes a main body of embedded wire box, connecting members, and locking members. The locking members are connected to the main body of embedded wire box and the connecting members, and the locking members are capable of driving the connecting members to move, so that the connecting members have an unfolded state and a restored state. When the connecting members are in the restored state, the main body of embedded wire box can be installed in the installation hole of the wall. When the connecting members are in the unfolded state, the locking members can be used for locking the wall between the main body of embedded wire box and the connecting members.

20 Claims, 5 Drawing Sheets

(56) References Cited

U.S. PATENT DOCUMENTS

| | | | |
|---|---|---|---|
| 2016/0039368 A1* | 2/2016 | Shitamichi | F16L 5/02 16/2.2 |
| 2017/0179703 A1* | 6/2017 | Kominato | H01B 7/0045 |
| 2017/0219100 A1* | 8/2017 | Kobayashi | F16J 15/3204 |
| 2017/0361790 A1* | 12/2017 | Kaefer | H01R 9/0524 |

* cited by examiner

WALL-EMBEDDED WIRE AND CABLE BOX

CROSS-REFERENCE TO RELATED APPLICATIONS

The application claims priority of Chinese patent application CN2024208322642, filed on Apr. 22, 2024, which is incorporated herein by reference in its entireties.

TECHNICAL FIELD

The present invention relates to an embedded wire box, in particular to a wall-embedded wire and cable box, applied in a technical field of wire boxes embedded in a wall.

BACKGROUND ART

In modern home decoration, people pursue a balance between aesthetics and practicality, and wall design is particularly important. The wiring issue of wires and cables is a crucial detail that needs to be properly resolved. To keep a wall clean and beautiful, wires and cables are often hidden inside the wall. But directly drilling a hole on the wall for wiring will damage the appearance and result in safety hazards, so a wall-embedded wire and cable box will be used for hiding the wires and cables wired outward, which is both beautiful and safe. However, the wide variety and different sizes of embedded wire boxes in the market have brought difficulties to the selection and use. There are differences in the size of different brands and models, and users need to choose the appropriate embedded wire box based on the size of the wall and the specifications of the wires and cables. However, there are numerous products on the market with various sizes labeled, making it difficult for users to quickly find matching products. Even if a properly sized embedded wire box is purchased, there may still be problems during the installation process. There may be slight differences between the hole of the wall and the size of the embedded wire box, resulting in unstable installation. Additional adjustments or processing may be required to ensure a solid and reliable installation, which brings selection and installation difficulties to users.

SUMMARY

Due to the variety of wall-embedded wire and cable box mentioned above in the prior art, it is difficult for customers to choose the correct size and model corresponding to an installation hole, and even if the embedded wire box with a suitable size is purchased, problems may also occur during installation, the hole of the wall and the size of the embedded wire box may be slightly different, resulting in unstable installation, and additional adjustment or processing may be required. In order to solve the above problems, a wall-embedded wire and cable box is provided by the present invention. By adjusting connecting members, the wall can be placed between the connecting members and a main body of embedded wire box. Then, by locking the connecting members with locking members, the entire wall-embedded wire and cable box is tightly connected to the wall, improving the adaptability of the wall-embedded wire and cable box, solving the problem of unstable installation caused by the mismatched size and model between the installation hole and the wall-embedded wire and cable box, thereby improving the user experience.

A technical solution is adopted by the present invention to solve the technical problem. A wall-embedded wire and cable box is configured for installing in an installation hole of a wall, the embedded wire box includes a main body of embedded wire box, connecting members, and locking members. The locking members are connected to the main body of embedded wire box and the connecting members. The locking members are capable of driving the connecting members to move, so that the connecting members are provided with an unfolded state and a restored state. When the connecting members are in the restored state, the main body of embedded wire box can be installed in the installation hole of the wall. When the connecting members are in the unfolded state, the locking members can be used for locking the wall between the main body of embedded wire box and the connecting members.

Furthermore, the main body of embedded wire box includes a first cylinder body and a first extension edge. The first extension edge is arranged around an outer side wall of the first cylinder body. One end of the locking members is connected to the first extension edge, and an opposite end of the locking members is used for connecting the connecting members. When the locking members are connected to the connecting members, the locking members are provided with a locking state and a moveable state. When the locking members are in the movable state, the locking members are capable of driving the connecting members to move, so that the first cylinder body can be inserted into the installation hole of the wall. When the locking members are in the locking state, the connecting members and the first extension edge are used for clamping the wall.

Furthermore, first openings are defined in the first extension edge, and a second opening is defined in the connecting members. The locking members pass through the first openings and are connected to the second opening, so that the connecting members are connected to the main body of embedded wire box through the locking members.

Furthermore, a first guide slot is defined in an outer side wall of the first cylinder body. An opening at a top of the first guide slot is arranged corresponding to the first openings, and one end of the connecting members provided with the second opening is arranged in the first guide slot. When the locking members pass through the first openings and are connected to the second opening, the locking members are capable of driving the connecting members to rotate in the first guide slot. The first guide slot includes a first side wall, and the first side wall is used for stopping the connecting members from rotating. When the first side wall of the first guide slot stops the connecting members from rotating, the locking members are capable of continuing to rotate and driving the connecting members to gradually approach the first extension edge.

Furthermore, the first guide slot further includes a second side wall. An inner side surface of the connecting members is equipped with a fixing slot on one end near the second opening, and the fixing slot is configured for allowing one end of the second side wall away from the first extension edge to be engaged.

Furthermore, the connecting members include a bottom plate and reinforcing ribs. A shape of the bottom plate is arranged based on a shape of an outer side wall of the first cylinder body. The reinforcing ribs are arranged on the bottom plate, and the second opening is defined in the bottom plate.

Furthermore, the reinforcing ribs are provided in a total number of two or more and are evenly spaced on an inner side surface of the bottom plate.

Furthermore, reinforcing members are arranged around the first cylinder body. The reinforcing members are integrally formed with the first cylinder body.

Furthermore, the reinforcing members are hollow box bodies.

Furthermore, a total number of the hollow box bodies is four, and the four hollow box bodies are evenly spaced.

Furthermore, the connecting members are arranged between two of the hollow box bodies, and the connecting members can be stored between two of the hollow box bodies.

Furthermore, the embedded wire box further includes a blocking cover made of soft rubber material. The blocking cover is arranged at an opening of the first cylinder body on one end equipped with the first extension edge. A deformation hole is defined in a middle of the blocking cover for wires to pass through.

Furthermore, the blocking cover detachably covers the opening of the first cylinder body. The deformation hole is arranged corresponding to the opening of the first cylinder body.

Furthermore, the blocking cover includes a second cylinder body, a second extension edge, and a middle sealing plate. The second extension edge is arranged on an outer side wall of the second cylinder body near one opening. The middle sealing plate is arranged at the opening of the second cylinder body and is positioned on one side equipped with the second extension edge. The deformation hole is defined in the middle sealing plate, and the second cylinder body is configured for installing inside the first cylinder body. When the second cylinder body is installed in the first cylinder body, the second extension edge abuts against the first extension edge, and the middle sealing plate covers the opening of the second cylinder body.

Furthermore, an outer side surface of the second cylinder body is provided with a fixing block on one end opposite to the second extension edge, and the first cylinder body is provided with a fixing opening for engaging with the fixing block. When the second cylinder body is installed in the first cylinder body, the fixing block can be engaged in the fixing opening.

Furthermore, an outer side surface of the fixing block gradually tilts away from a side wall of the second cylinder body from a position near the opening of the second cylinder body towards a direction of the second extension edge.

Furthermore, a second guide slot is defined in an inner side wall of the first cylinder body. The second guide slot is connected to the fixing opening. A guide rail is arranged on an outer side wall of the second cylinder body. The guide rail is connected to the fixing block, so that the fixing block is capable of sliding along the second guide slot and being inserted into the fixing opening via the guide rail.

Furthermore, an outer edge of the second extension edge is equipped with a wrapping edge. The wrapping edge is used for wrapping an outer edge of the first extension edge.

Furthermore, a middle of the blocking cover is divided into four plates, so that the deformation hole forms a cross shape.

Furthermore, four sides of the cross shape are all arranged in an inward concave-arc shape, and the inward concave arcs are all arranged in an identical direction.

The wall-embedded wire and cable box is provided in the present invention. By adjusting the connecting members, the wall can be placed between the connecting members and the main body of embedded wire box. Then, by locking the connecting members with the locking members, the entire wall-embedded wire and cable box is tightly connected to the wall, improving the adaptability of the wall-embedded wire and cable box, solving the problem of unstable installation caused by the mismatched size and model between the installation hole and the wall-embedded wire and cable box, thereby improving the user experience.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
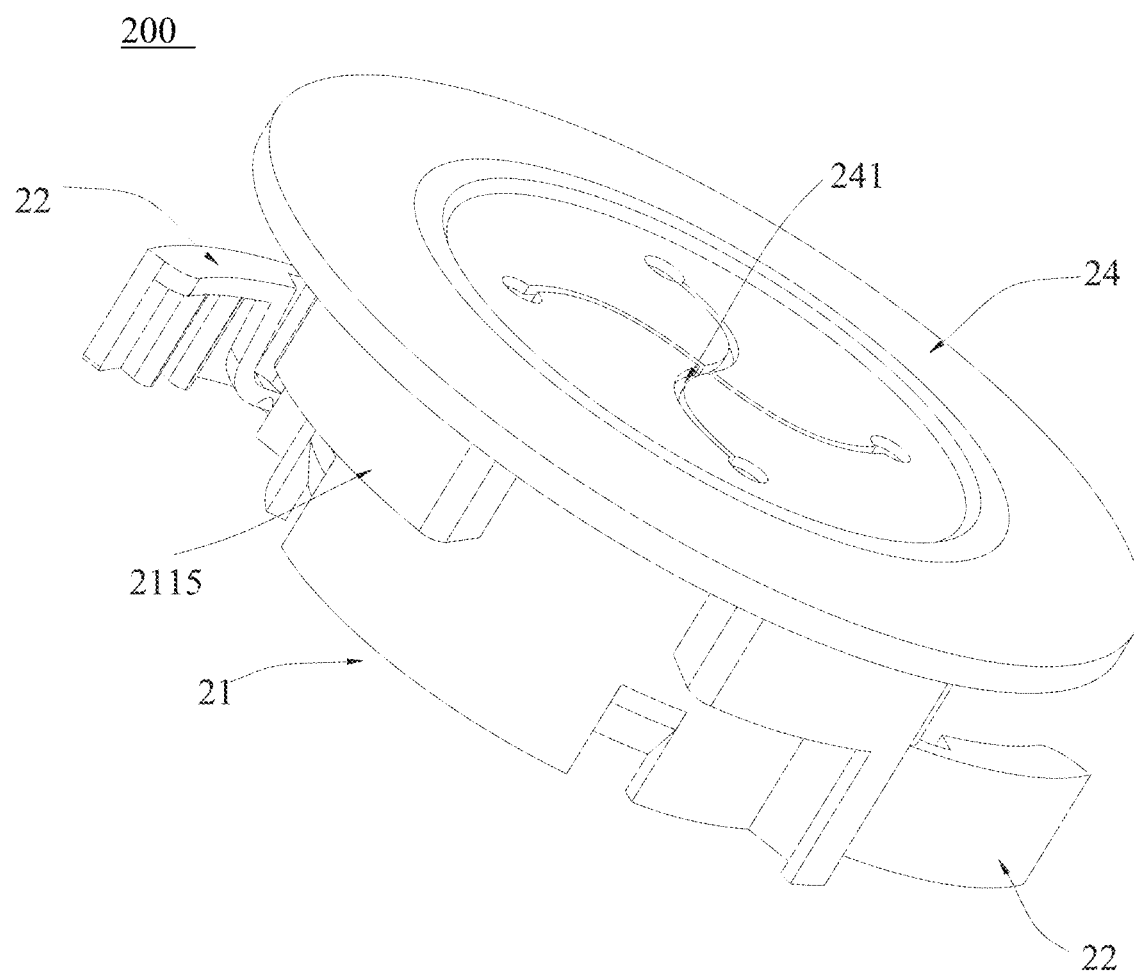
FIG. 1 is a perspective view of an embedded wire box according to the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
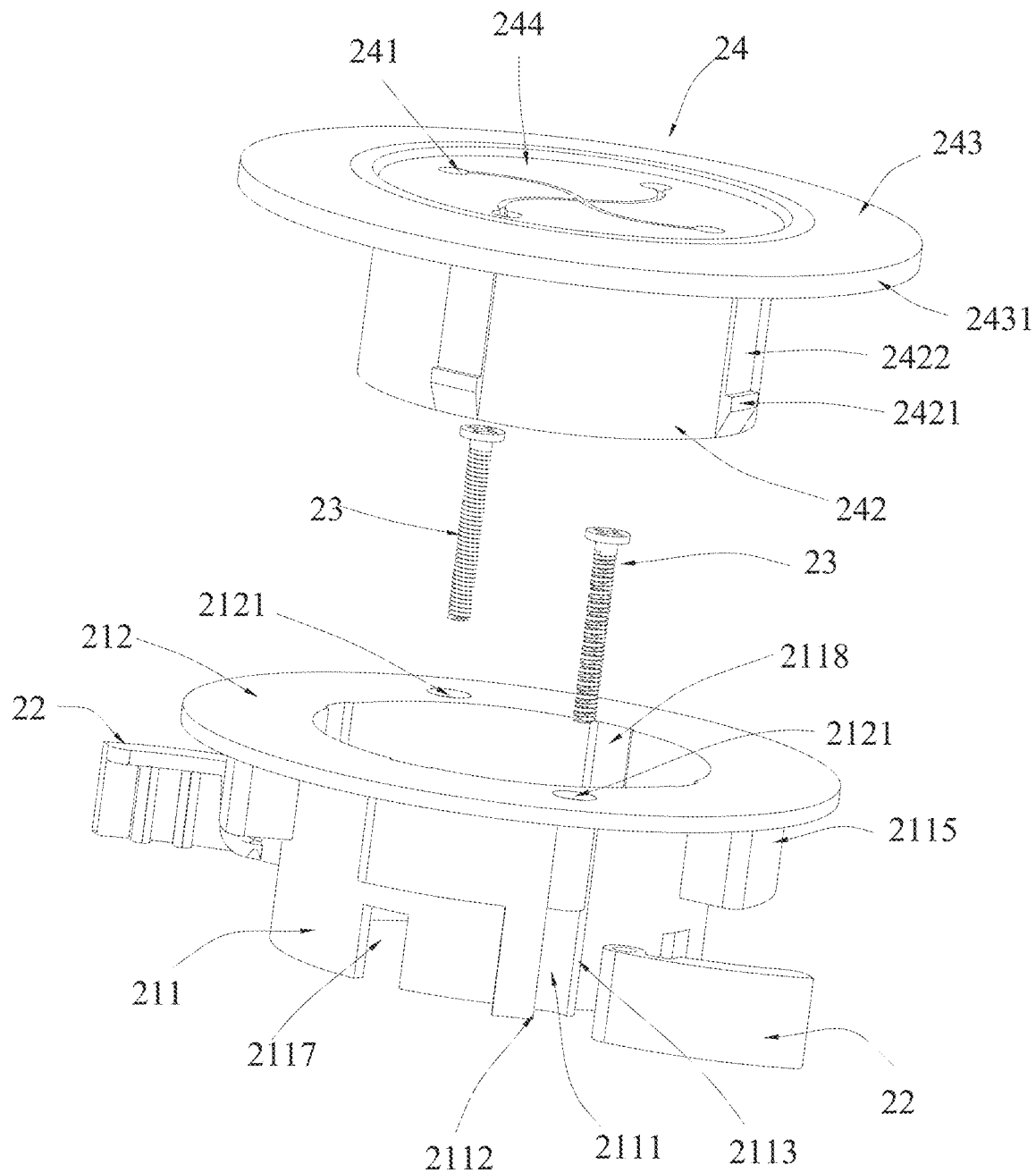
FIG. 2 is an exploded view of an embedded wire box according to the present invention.
Figure 3:
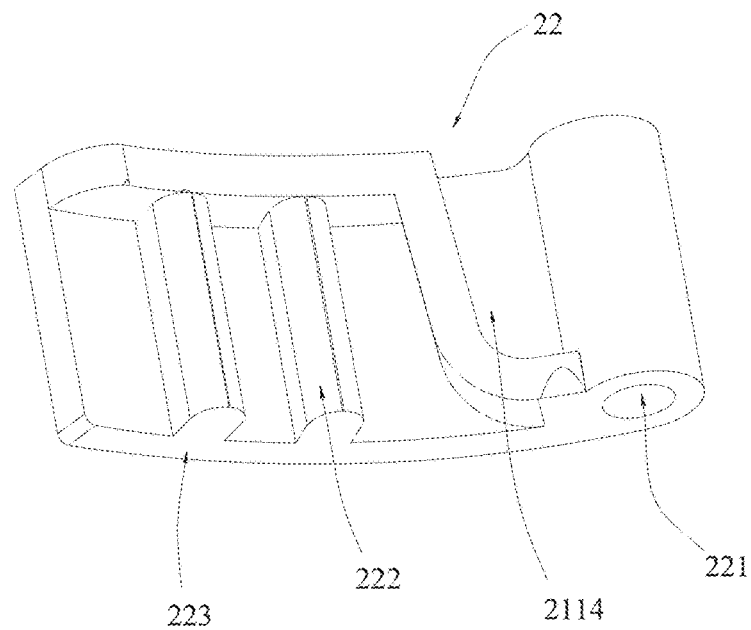
FIG. 3 is a perspective view of a connecting member according to the present invention.
Figure 4:
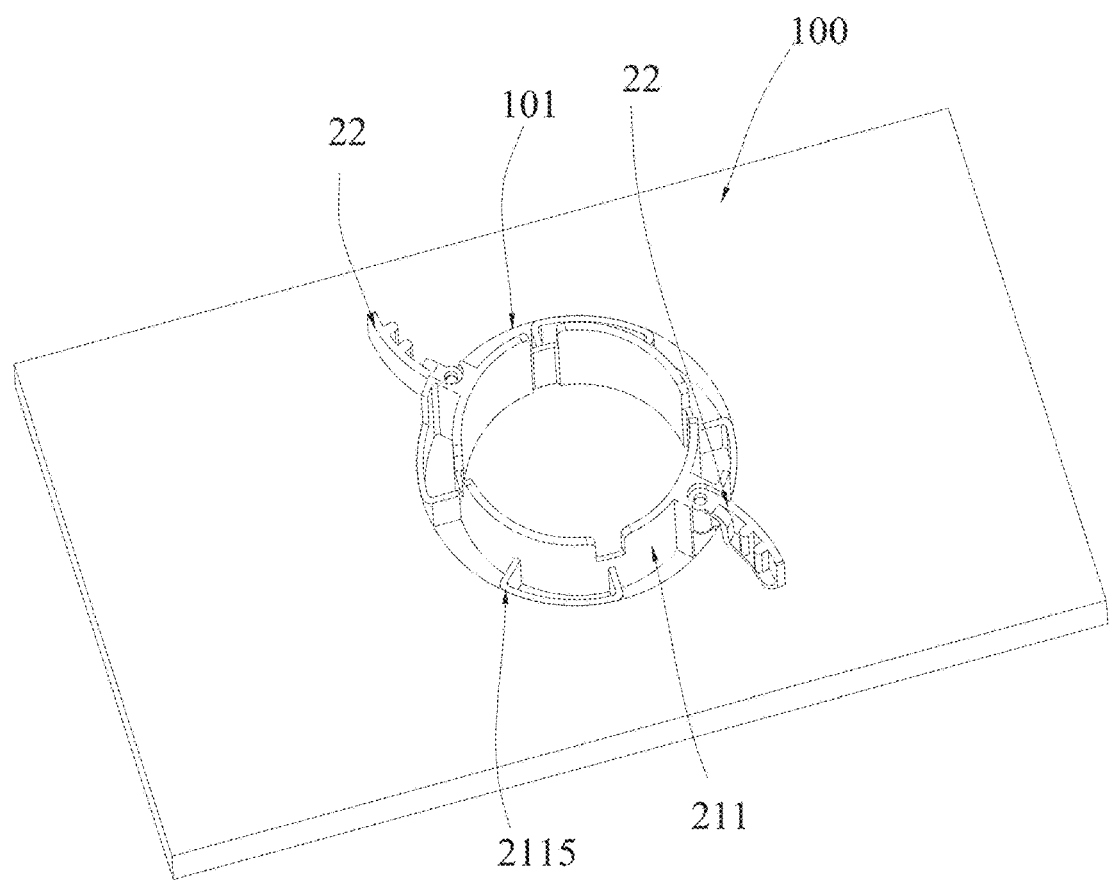
FIG. 4 is an installation schematic diagram of a main body of embedded wire box according to the present invention.

FIGS. 1-6 show a wall-embedded wire and cable box provided in the present invention. As shown in FIGS. 1-2, an embedded wire box 200 includes a main body of embedded wire box 21, connecting members 22, and locking members 23. As shown in FIG. 4, the locking members 23 are connected to the main body of embedded wire box 21 and the connecting members 22. The locking members 23 are capable of driving the connecting members 22 to move, so that the connecting members 22 are provided with an unfolded state and a restored state. When the connecting members 22 are in the restored state, the main body of embedded wire box 21 can be installed in an installation hole 101 of a wall 100. When the connecting members 22 are in the unfolded state, the locking members 23 can be used for locking the wall 100 between the main body of embedded wire box 21 and the connecting members 22. That is, by adjusting the connecting members 22, the wall 100 can be placed between the connecting members 22 and the main body of embedded wire box 21. Then, by locking the connecting members 22 with the locking members 23, the entire wall-embedded wire and cable box is firmly connected to the wall 100, improving the adaptability of the wall-embedded wire and cable box, solving the problem of unstable installation caused by the mismatched size and model between the installation hole 101 and the wall-embedded wire and cable box, thereby improving the user experience. It should be noted that a length of the connecting members 22 should be set slightly longer. If an opening of the wall is large, the main body of embedded wire box 21 can also be stably installed on the wall 100, making the adaptability of the wall-embedded wire and cable box stronger.

A plurality of connecting members 22 can be provided, and in this embodiment, it is preferred to provide two connecting members 22. The two connecting members 22 are provided on opposite sides of the main body of embedded wire box 21, which is equivalent to widening a diameter of the main body of embedded wire box 21. Using two connecting members 22 makes clamping more stable, making it no need to set other engaging structures to maintain the stability of the installation of the wall-embedded wire and cable box. It should be noted that a total number of the connecting members 22 should correspond to a total number of the locking components 23, as shown in FIG. 2.

In this embodiment, the main body of embedded wire box 21 includes a first cylinder body 211 and a first extension edge 212. The first extension edge 212 is arranged around an outer side wall of the first cylinder body 211. One end of the locking members 23 is connected to the first extension edge 212, and an opposite end of the locking members 23 is used for connecting the connecting members 22. When the locking members 23 are connected to the connecting members 22, the locking members 23 are provided with a locking state and a moveable state. When the locking members 23 are in the movable state, the locking members 23 are capable of driving the connecting members 22 to move, so that the first cylinder body 211 can be inserted into the installation hole 101 of the wall 100. When the locking members 23 are in the locking state, the connecting members 22 and the first extension edge 212 are used for clamping the wall 100. A function of the first extension edge 212 is to cover openings of the entire wall 100, so as to make an exterior of the wall 100 more aesthetically pleasing and facilitate the connection between the locking members 23 and the connecting members 22, thereby making it convenient for users to lock the connecting members 22 through the locking members 23 and facilitating installation.

In this embodiment, first openings 2121 are defined in the first extension edge 212, and a second opening 221 is defined in the connecting members 22. The locking members 23 pass through the first openings 2121 and are connected to the second opening 221, so that the connecting members 22 are connected to the main body of embedded wire box 21 through the locking members 23. The first openings 2121 and the second opening 221 are not designed with complex structures, so as to facilitate demolding. The locking members 23 can be bolts, and the first openings 2121 may not have threads inside, facilitating the rotation of the bolts. The first openings 2121 may also have threads inside, making the rotation of the bolts more stable. In this embodiment, the first openings 2121 have no threads inside, while the second opening 221 is provided with threads inside. The bolts gradually drive the connecting members 22 closer to the first extension edge 212, making the first extension edge 212 and the connecting members 22 together clamp the wall 100, so that the entire wall-embedded wire and cable box is securely connected to the wall 100.

In this embodiment, a first guide slot 2111 is defined in an outer side wall of the first cylinder body 211. An opening at a top of the first guide slot 2111 is arranged corresponding to the first openings 2121, and one end of the connecting members 22 provided with the second opening 221 is arranged in the first guide slot 2111. When the locking members 23 pass through the first openings 2121 and are connected to the second opening 221, the locking members 23 are capable of driving the connecting members 22 to rotate in the first guide slot 2111. The first guide slot 2111 includes a first side wall 2112, and the first side wall 2112 is used for stopping the connecting members 22 from rotating. When the first side wall 2112 of the first guide slot 2111 stops the connecting members 22 from rotating, the locking members 23 are capable of continuing to rotate and driving the connecting members 22 to gradually approach the first extension edge 212. One purpose of arranging the first guide slot 2111 is to limit the rotation of the connecting members 22. When the connecting members 22 are in a position of not being able to rotate, the locking members 23 can rotate to make the connecting members 22 gradually approach the first extension edge 212 until the wall is clamped. The first guide slot 2111 facilitates the installation of the locking members 23 and connecting members 22.

In this embodiment, the first guide slot 2111 further includes a second side wall 2113. An inner side surface of the connecting members 22 is equipped with a fixing slot 2114 on one end near the second opening 221, and the fixing slot 2114 is configured for allowing one end of the second side wall 2113 away from the first extension edge 212 to be engaged, so that the connecting members 22 remains in the restored state when in the restored state. If the fixing slot 2114 is not equipped, the connecting members 22 will be unable to remain in the restored state, and the connecting members 22 will move back and forth between the unfolded state and the restored state, which is easy to damage the connecting members 22 and the main body of embedded wire box 21, and is not convenient for users to carry.

In this embodiment, the connecting members 22 include a bottom plate 223 and reinforcing ribs 222. A shape of the bottom plate is arranged based on a shape of an outer side wall of the first cylinder body 211. The reinforcing ribs 222 are arranged on the bottom plate 223, and the second opening 221 is defined in the bottom plate. The reinforcing ribs 222 increase a load on the bottom plate 223, preventing the bottom plate 223 from breaking under excessive force. The reinforcing ribs 222 are also equivalent to anti-slip patterns, making it easier for users to hold the connecting members 22 and facilitating the installation of the locking members 23 and the connecting members 22 when not in use on the wall. In this embodiment, the reinforcing ribs 222 are provided in a total number of two or more and are evenly spaced on an inner side surface of the bottom plate 223, making the stability stronger.

In this embodiment, reinforcing members 2115 are arranged around the first cylinder body 211. The reinforcing members 2115 are integrally formed with the first cylinder body 211. The reinforcing members 2115 increase a thickness of the first cylinder body 211 and enhance the bearing capacity of the first cylinder body 211, making the first cylinder body 211 less susceptible to damage under stress.

In this embodiment, the reinforcing members 2115 are hollow box bodies. The reinforcing members 2115 increase the bearing capacity of the first cylinder body 211 while reducing an overall weight of the wall-embedded wire and cable box. One side of the hollow box bodies is connected to the first extension edge 212, and an opening is defined in an opposite side of the side the hollow box bodies connected to the first extension edge 212 for easy demolding.

In this embodiment, a total number of the hollow box bodies is four, and the four hollow box bodies are evenly spaced.

In this embodiment, the connecting members 22 are arranged between two of the hollow box bodies, and the connecting members 22 can be stored between two of the hollow box bodies, thereby facilitating the storage and setting of the connecting members 22, and making an overall appearance of the wall-embedded wire and cable box more tidy.

In this embodiment, the embedded wire box 200 further includes a blocking cover 24 made of soft rubber material. The blocking cover 24 is arranged at an opening of the first cylinder body 211 on one end equipped with the first extension edge 212. A deformation hole 241 is defined in a middle of the blocking cover 24 for wires to pass through, and the blocking cover 24 covers an opening on the wall, facilitating the passage of wires and cables.

In this embodiment, the blocking cover 24 detachably covers the opening of the first cylinder body 211 for easy assembly, and the blocking cover 24 is also capable of covering the locking members 23, making the wall-embedded wire and cable box more aesthetically pleasing as a whole. The deformation hole 241 is arranged corresponding to the opening of the first cylinder body 211.

In this embodiment, the blocking cover 24 includes a second cylinder body 242, a second extension edge 243, and a middle sealing plate 244. The second cylinder body 242, the second extension edge 243, and the middle sealing plate 244 are all made of soft rubber material. The second extension edge 243 is arranged on an outer side wall of the second cylinder body 242 near one opening. The middle sealing plate 244 is arranged at the opening of the second cylinder body 242 and is positioned on one side equipped with the second extension edge 243. The deformation hole 241 is defined in the middle sealing plate 244, and the second cylinder body 242 is configured for installing inside the first cylinder body 211. When the second cylinder body 242 is installed in the first cylinder body 211, the second extension edge 243 abuts against the first extension edge 212, and the middle sealing plate 244 covers the opening of the second cylinder body 242. Since the blocking cover 24 is made of soft rubber material, the second extension edge 243 is capable of protecting the first extension edge 212. The second cylinder body 242 is made of soft rubber material, facilitating the installation of the second cylinder body 242 in the first cylinder body 211, increasing the protection of the first cylinder body 211, and also preventing friction damage to wires and cables when the wires and cables are in the first cylinder body 211.

In this embodiment, an outer side surface of the second cylinder body 242 is provided with a fixing block 2421 on one end opposite to the second extension edge 243, and the first cylinder body 211 is provided with a fixing opening 2117 for engaging with the fixing block 2421. When the second cylinder body 242 is installed in the first cylinder body 211, the fixing block 2421 can be engaged in the fixing opening 2117, so that the blocking cover 24 can be stably installed on the main body of embedded wire box 21.

In this embodiment, an outer side surface of the fixing block 2421 gradually tilts away from a side wall of the second cylinder body 242 from a position near the opening of the second cylinder body 242 towards a direction of the second extension edge 243, facilitating the installation and removal of the blocking cover 24.

In this embodiment, a second guide slot 2118 is defined in an inner side wall of the first cylinder body 211. The second guide slot 2118 is connected to the fixing opening 2117. A guide rail 2422 is arranged on an outer side wall of the second cylinder body 242. The guide rail 2422 is connected to the fixing block 2421, so that the fixing block 2421 is capable of sliding along the second guide slot 2118 and being inserted into the fixing opening 2117 via the guide rail 2422, making it easier for users to install the blocking cover 24 on the main body of embedded wire box 21, thereby saving users' time and effort.

In this embodiment, an outer edge of the second extension edge 243 is equipped with a wrapping edge 2431. The wrapping edge 2431 is used for wrapping an outer edge of the first extension edge 212, so that the blocking cover 24 is integrally formed with the main body of embedded wire box 21 in appearance, making an overall appearance of the wall-embedded wire and cable box more aesthetically pleasing.

In this embodiment, a middle of the blocking cover 24 is divided into four plates, so that the deformation hole 241 forms a cross shape, making it more convenient for wires and cables to pass through.

In this embodiment, four sides of the cross shape are all arranged in an inward concave-arc shape, and the inward concave arcs are all arranged in an identical direction, making the stability of clamping of the deformation hole 241 higher.

Figure 5:
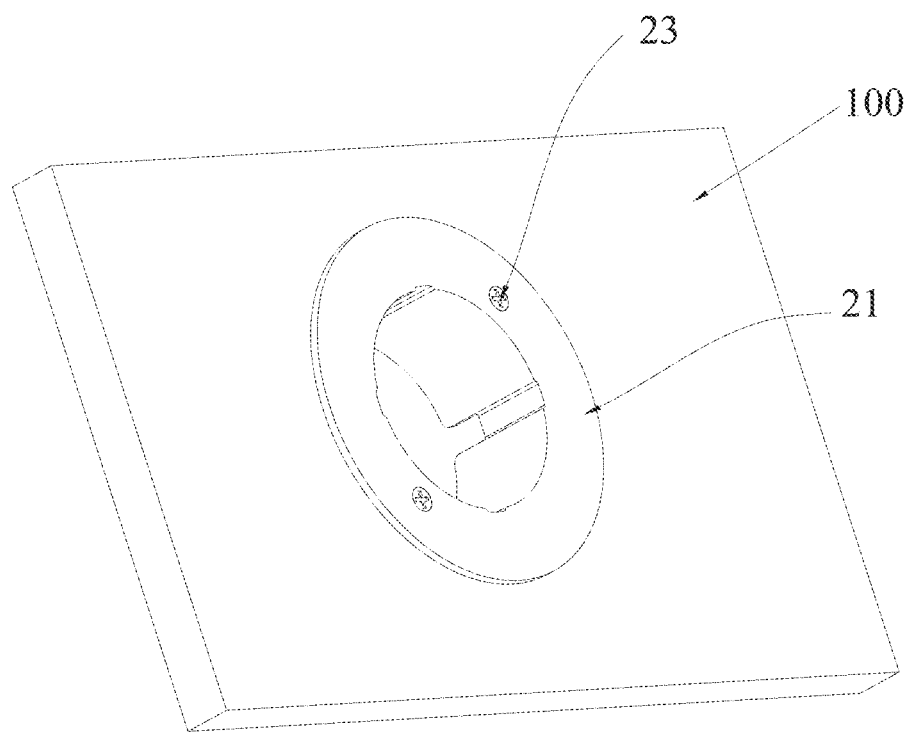
FIG. 5 is an installation schematic diagram from another perspective of FIG. 4 according to the present invention.
Figure 6:
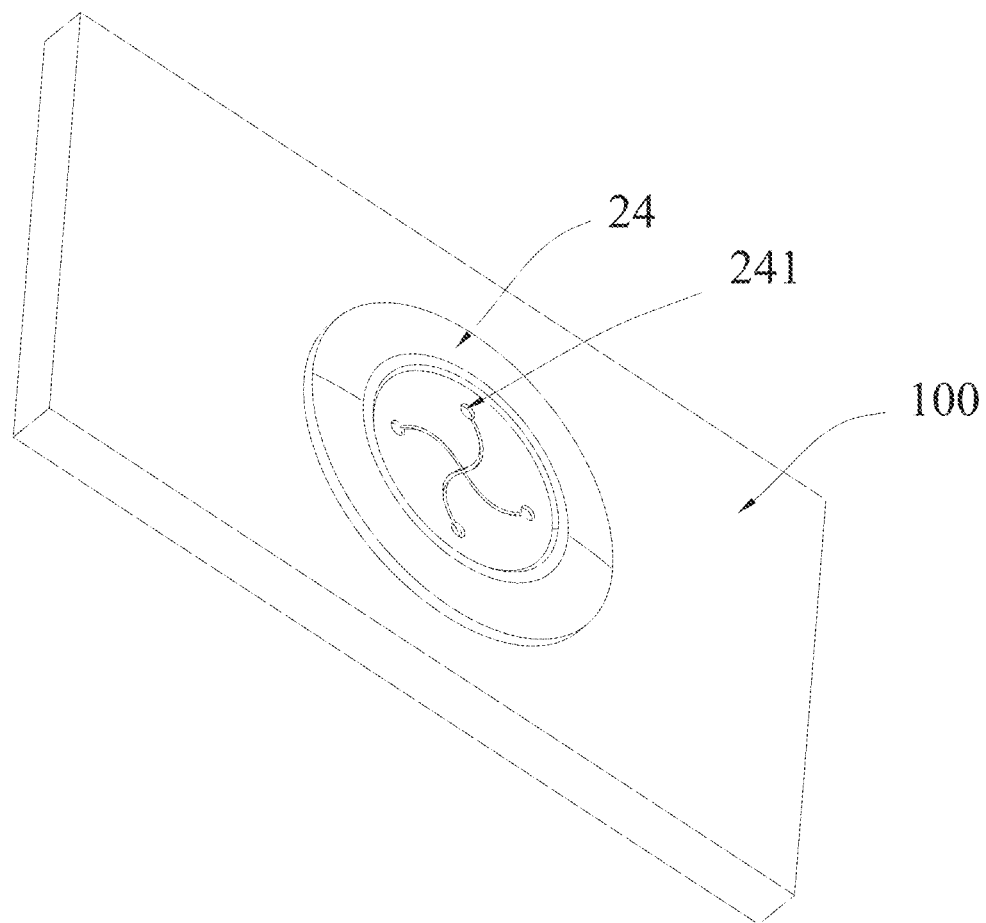
FIG. 6 is an installation schematic diagram of an embedded wire box according to the present invention.

As shown in FIGS. 4-6, an installation process of the wall-embedded wire and cable box in this embodiment is as follows: the locking members 23 movably connects the connecting members 22 to the main body of embedded wire box 21, the main body of embedded wire box 21 is inserted, the wall is clamped between the connecting members 22 and the main body of embedded wire box 21, the connecting members 22 are locked by the locking member 23, and then the blocking cover 24 is installed on the main body of embedded wire box 21.

In summary, an overall structure of the wall-embedded wire and cable box is simple, and the assembly is simple and stable, solving the problem of users being unable to install due to the mismatch of existing wall-embedded wire and cable box, making it more convenient for users to install and use, thereby improving user experience.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A wall-embedded wire and cable box, being configured for installing in an installation hole of a wall, the embedded wire box comprising a main body of embedded wire box, connecting members, and locking members, wherein the locking members are connected to the main body of embedded wire box and the connecting members, and the locking members are capable of driving the connecting members to move, so that the connecting members are provided with an unfolded state and a restored state; when the connecting members are in the restored state, the main body of embedded wire box can be installed in the installation hole of the wall; when the connecting members are in the unfolded state, the locking members can be used for locking the wall between the main body of embedded wire box and the connecting members.

2. The wall-embedded wire and cable box of claim 1, wherein the main body of embedded wire box comprises a first cylinder body and a first extension edge, the first extension edge is arranged around an outer side wall of the first cylinder body, one end of the locking members is connected to the first extension edge, and an opposite end of the locking members is used for connecting the connecting members; when the locking members are connected to the connecting members, the locking members are provided with a locking state and a moveable state; when the locking members are in the movable state, the locking members are capable of driving the connecting members to move, so that the first cylinder body can be inserted into the installation hole of the wall; when the locking members are in the locking state, the connecting members and the first extension edge are used for clamping the wall.

3. The wall-embedded wire and cable box of claim 2, wherein first openings are defined in the first extension edge, a second opening is defined in the connecting members, and the locking members pass through the first openings and are connected to the second opening, so that the connecting members are connected to the main body of embedded wire box through the locking members.

4. The wall-embedded wire and cable box of claim 3, wherein a first guide slot is defined in an outer side wall of the first cylinder body, an opening at a top of the first guide slot is arranged corresponding to the first openings, and one end of the connecting members provided with the second opening is arranged in the first guide slot; when the locking members pass through the first openings and are connected to the second opening, the locking members are capable of driving the connecting members to rotate in the first guide slot; the first guide slot comprises a first side wall, and the first side wall is used for stopping the connecting members from rotating; when the first side wall of the first guide slot stops the connecting members from rotating, the locking members are capable of continuing to rotate and driving the connecting members to gradually approach the first extension edge.

5. The wall-embedded wire and cable box of claim 4, wherein the first guide slot further comprises a second side wall, an inner side surface of the connecting members is equipped with a fixing slot on one end near the second opening, and the fixing slot is configured for allowing one end of the second side wall away from the first extension edge to be engaged.

6. The wall-embedded wire and cable box of claim 4, wherein the connecting members comprise a bottom plate and reinforcing ribs, a shape of the bottom plate is arranged based on a shape of an outer side wall of the first cylinder body, the reinforcing ribs are arranged on the bottom plate, and the second opening is defined in the bottom plate.

7. The wall-embedded wire and cable box of claim 6, wherein the reinforcing ribs are provided in a total number of two or more and are evenly spaced on an inner side surface of the bottom plate.

8. The wall-embedded wire and cable box of claim 2, wherein reinforcing members are arranged around the first cylinder body, and the reinforcing members are integrally formed with the first cylinder body.

9. The wall-embedded wire and cable box of claim 8, wherein the reinforcing members are hollow box bodies.

10. The wall-embedded wire and cable box of claim 9, wherein a total number of the hollow box bodies is four, and the four hollow box bodies are evenly spaced.

11. The wall-embedded wire and cable box of claim 10, wherein the connecting members are arranged between two of the hollow box bodies, and the connecting members can be stored between two of the hollow box bodies.

12. The wall-embedded wire and cable box of claim 2, wherein the embedded wire box further comprises a blocking cover made of soft rubber material, the blocking cover is arranged at an opening of the first cylinder body on one end equipped with the first extension edge, and a deformation hole is defined in a middle of the blocking cover for wires to pass through.

13. The wall-embedded wire and cable box of claim 12, wherein the blocking cover detachably covers the opening of the first cylinder body, and the deformation hole is arranged corresponding to the opening of the first cylinder body.

14. The wall-embedded wire and cable box of claim 13, wherein the blocking cover comprises a second cylinder body, a second extension edge, and a middle sealing plate; the second extension edge is arranged on an outer side wall of the second cylinder body near one opening, the middle sealing plate is arranged at the opening of the second cylinder body and is positioned on one side equipped with the second extension edge, the deformation hole is defined in the middle sealing plate, and the second cylinder body is configured for installing inside the first cylinder body; when the second cylinder body is installed in the first cylinder body, the second extension edge abuts against the first extension edge, and the middle sealing plate covers the opening of the second cylinder body.

15. The wall-embedded wire and cable box of claim 14, wherein an outer side surface of the second cylinder body is provided with a fixing block on one end opposite to the second extension edge, and the first cylinder body is provided with a fixing opening for engaging with the fixing block; when the second cylinder body is installed in the first cylinder body, the fixing block can be engaged in the fixing opening.

16. The wall-embedded wire and cable box of claim 15, wherein an outer side surface of the fixing block gradually tilts away from a side wall of the second cylinder body from a position near the opening of the second cylinder body towards a direction of the second extension edge.

17. The wall-embedded wire and cable box of claim 15, wherein a second guide slot is defined in an inner side wall of the first cylinder body, the second guide slot is connected to the fixing opening, a guide rail is arranged on an outer side wall of the second cylinder body, and the guide rail is connected to the fixing block, so that the fixing block is capable of sliding along the second guide slot and being inserted into the fixing opening via the guide rail.

18. The wall-embedded wire and cable box of claim 14, wherein an outer edge of the second extension edge is equipped with a wrapping edge, and the wrapping edge is used for wrapping an outer edge of the first extension edge.

19. The wall-embedded wire and cable box of claim 12, wherein a middle of the blocking cover is divided into four plates, so that the deformation hole forms a cross shape.

20. The wall-embedded wire and cable box of claim 19, wherein four sides of the cross shape are all arranged in an inward concave-arc shape, and the inward concave arcs are all arranged in an identical direction.

* * * * *